Aug. 5, 1958  JOAQUIN CRESPO Y GARCIA  2,846,316
METHOD OF CANNING, BOTTLING AND PRESERVING
FERMENTABLE SOLIDS AND LIQUIDS
Filed Oct. 24, 1952  3 Sheets-Sheet 1
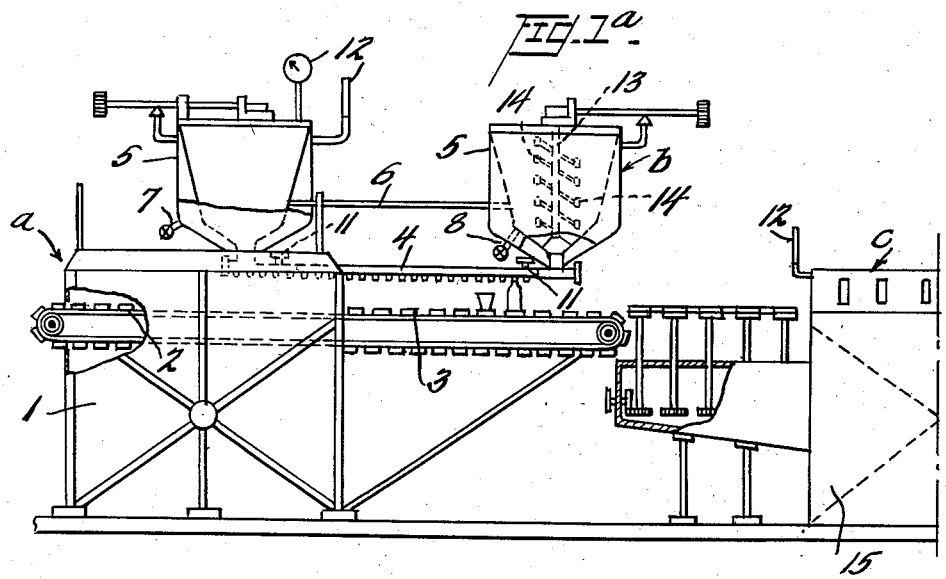
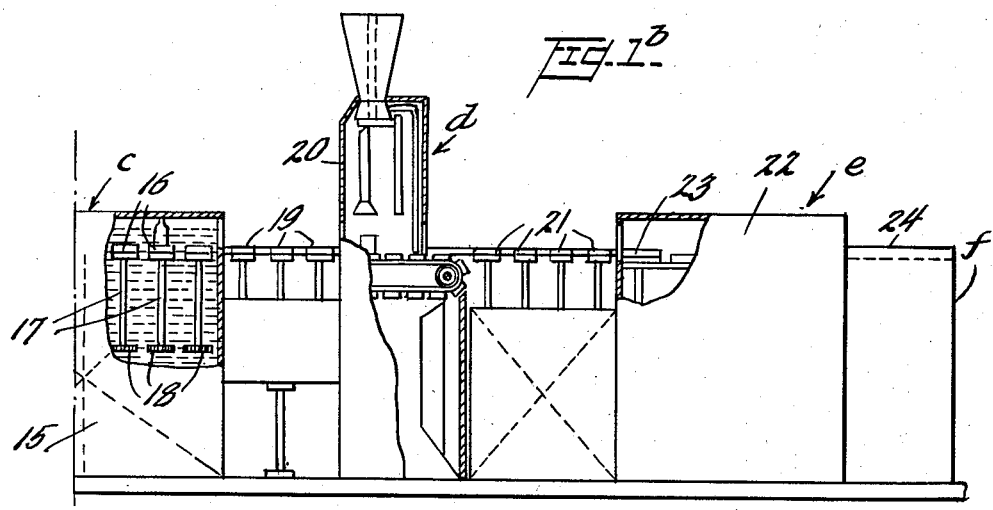
INVENTOR
Joaquin Crespo y Garcia
BY Watson, Cole, Grindle & Watson
ATTORNEY

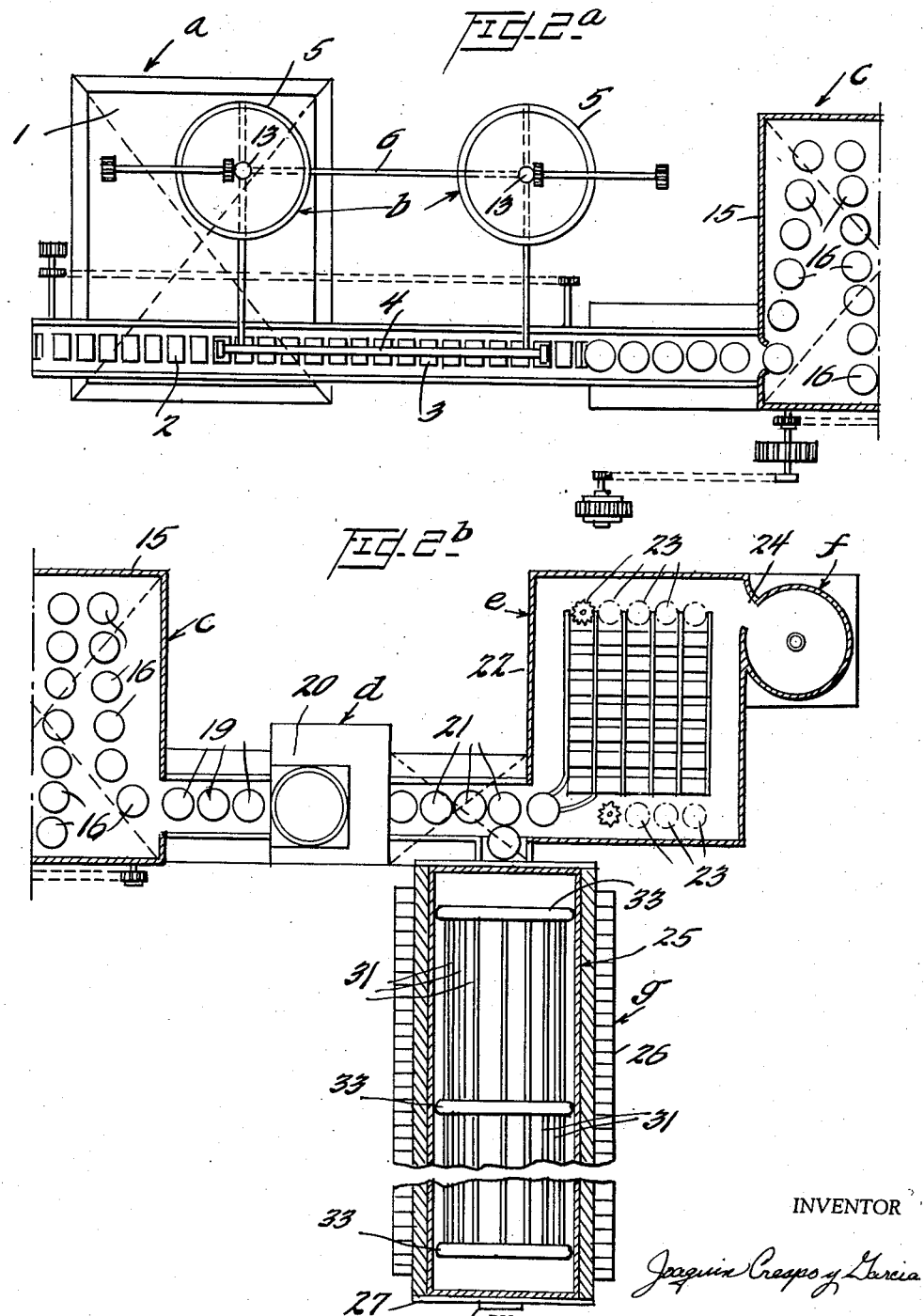

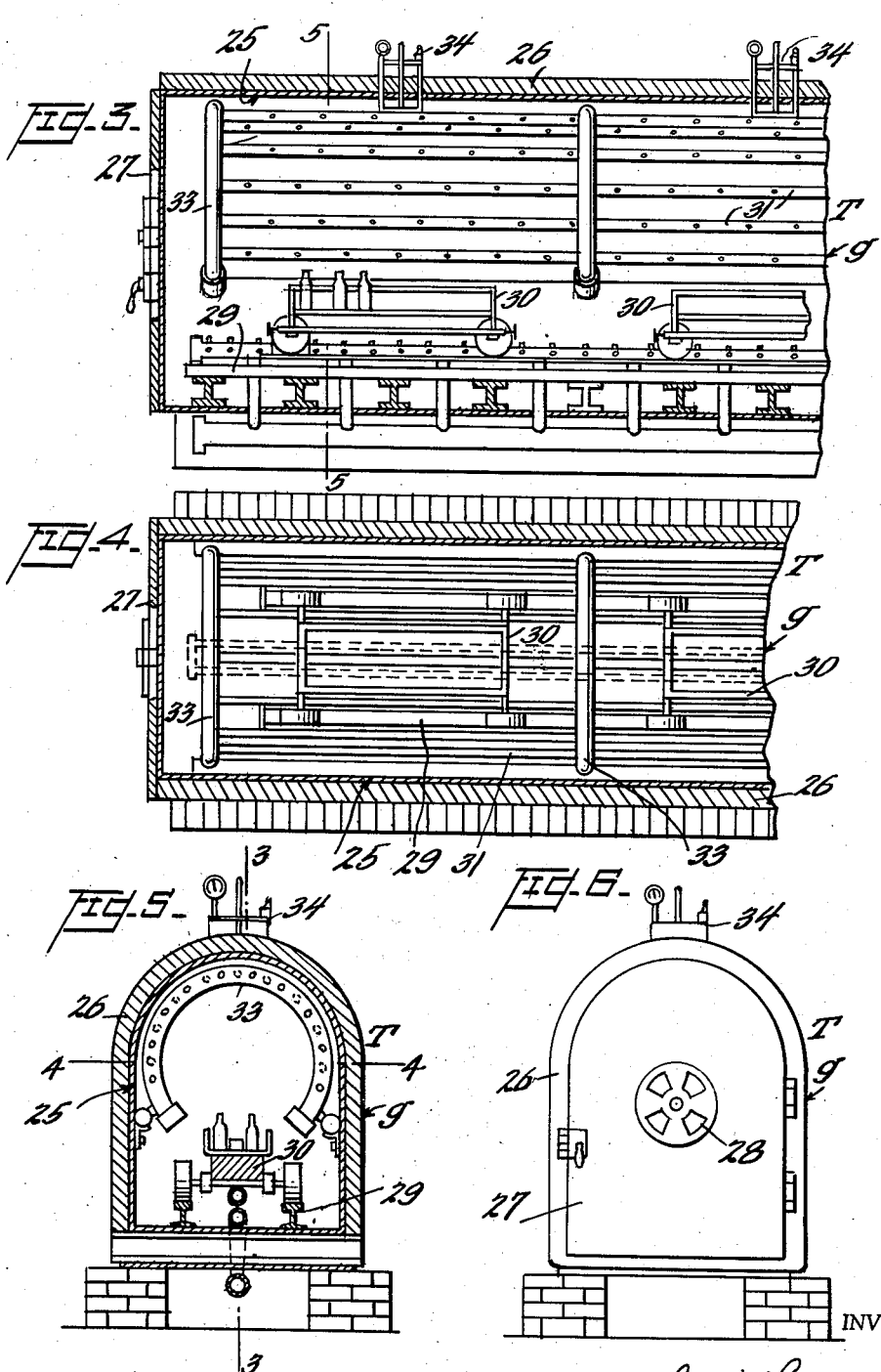

United States Patent Office 2,846,316
Patented Aug. 5, 1958

2,846,316

METHOD OF CANNING, BOTTLING, AND PRESERVING FERMENTABLE SOLIDS AND LIQUIDS

Joaquin Crespo y Garcia, Mexico City, Mexico

Application October 24, 1952, Serial No. 316,738

Claims priority, application Mexico October 24, 1951

5 Claims. (Cl. 99—182)

The present invention relates to a new method of canning, bottling and preserving fermentable liquids and food products and apparatus for carrying out this method.

An object of the present invention is to provide an improved method of preserving drinkable and edible materials without the use of artificial preservatives or chemical ingredients, except sugar or artificial coloring, which up to now have been required for efficient preservation.

A further object of the present invention is a preserving method which permits the products to be packed either fresh or in a state of fermentation. In the first case, all fermentation is prevented. In the second case, with products already fermented, subsequent or secondary fermentation is avoided, the products being permanently maintained at whatever stage of fermentation they may happen to be undergoing at the time of treatment.

It is another object of the present invention to provide a continuous process especially adapted for use on an industrial scale for canning, bottling or packing milks; wines; frothy wines; liquors; beers; fruit concentrates; fermentable fruit juices; such as juices of apple, pineapple, grape, sugar cane, strawberry, prune, cherry, grapefruit, lime, lemon and orange, etc.; and vegetables, such as: tomatoes, carrots, turnips, beets, cabbages, etc.; either in glass jars, cans, or wooden containers, such as barrels, kegs, bags and the like.

A method according to the present invention comprises three primary operations:

PREHEATING

The particular material to be preserved is subjected to a temperature of from 30–65° C. and preferably from 45–55° C. for a time ranging from 5 to 55 minutes and preferably from 20 to 45 minutes, being stirred all the while to obtain a homogeneous density and uniform temperature. This treatment is carried out in the absence of oxygen to prevent oxidation of the material being processed, this reaction being responsible for disagreeable changes in flavor. The ranges of above time and temperatures are sufficient to destroy those vegetal microorganisms which are affected by heat.

CANNING, OVERHEATING AND SEALING

The preheated material is introduced into previously sterilized and pre-heated containers, such in amount slightly less than the capacity of the container to provide for subsequent expansion of the material. The filled containers are moved to an immersion chamber, where they are heated at a temperature of from 55–87° C. and preferably from 35 to 50 minutes, the particular time and temperature being selected in accordance with the density of the material being treated, so that as the treatment progresses, the material expands to completely fill the container without leaving any air chamber whatsoever. Thus, a vacuum is formed in the container when the material cools after the third operation is completely finished.

Following overheating, the containers are hermetically sealed, the temperature prevailing during overheating being maintained throughout the sealing operation.

SUPERHEATING

As a final step, the sealed containers and their contents are superheated at a temperature from 92–103° C., a pressure of 1 to 6½ pounds and a time from 5 to 60 minutes and preferably from 35 to 50 minutes, the treatment preferably being carried out by the use of live steam under a pressure of from 1 to 6½ pounds.

During this treatment, the liquids do not acquire a flavor characteristic of "cooked foods," because by eliminating any air space in the container, internal and external pressures balance each other, and therefore, there can be no boiling of the liquid within the containers. Moreover, the oxygen has been eliminated from the containers during the first and second stages of the process and a change in flavor due to oxidation is prevented.

Furthermore, in this last stage I employ such high temperatures and pressures as to kill the thermophiles and thermodurics and to destroy or inhibit spores which may have resisted the temperatures of the two preliminary steps.

Another result of this treatment is that by using the high temperatures during the time-intervals mentioned, the natural enzymes of the fruits, fruit juices, milk or other fermentable materials so treated are destroyed or inhibited, with the result that, notwithstanding long periods of storage, the resultant product undergoes no change from its original characteristics and fully retains its flavor and edibility.

The processing of the third stage is done in accordance with the altitude and barometric pressure of the place where the processing is performed, and this varies within the ranges and intervals stated above.

Lastly, the cooling of the processed foods is not sudden, but gradual, in keeping with the product treated, that is, taking into consideration the constants of acidity, density, index of refraction, sacarometric grade, etc., such constants having been observed before processing, so as to keep the original characteristic flavor, and preserve it as if the foods were fresh.

The characteristic details of this new method are clearly depicted in the following description and in the accompanying drawings. The same reference numbers serve to indicate the same parts in all four drawings.

Figs. 1a and 1b are side elevation views, partially cut away, of the complete machine;

Figs. 2a and 2b are top plan views of the machine;

Fig. 3 is a view in vertical section of the thermal chamber used in the present invention, taken substantially along line 3—3 of Fig. 5.

Fig. 4 is a horizontal section of the chamber, taken substantially along line 4—4 of Fig. 5;

Fig. 5 is a sectional elevation of the chamber along lines 5—5 of Fig. 3; and

Fig. 6 is a front elevation of the chamber.

The first step in the method in the present invention is to preheat the liquids or foods before canning, without reaching the boiling point. The preheat temperature is maintained during the canning process after which, but before sealing, the liquid in the receptacle is overheated. Then, the temperature is gradually lowered until room temperature is reached. When the receptacles have been sealed, they are subjected to superheating under pressure, so that the contents do not reach the boiling point, thus avoiding the loss of its organic characteristics, such as flavor, color, smell, density and acidity.

By this method we indefinitely preserve milks, or milk in combination with cocoa, vanilla, strawberry, coffee, malt and sugar; beers, wines, frothy wines, liquors, and in general, all kinds of fermentable liquids, solids, semi-solids, concentrates, syrups and food products. This is done without altering the acidity of the milk, or milk in combination with other products, or in other words, the normal acidity or sweetness of the product remains stable, as it was in the moment of canning. As regards wines and liquors, they are preserved with their original alcoholic content, that is, without having to add an alcohol base in order to prolong their durability. With respect to beers, they may be preserved in barrels at room temperature without the necessity of refrigeration. The method of the present invention, broadly speaking, is an innovation upon processes known as pasteurization, tyndalization, sterilization and buddenization.

In order to carry out the present method in an industrial scale, I have devised apparatus which is part of the present invention and whose general principles of operation and construction are shown in the drawings herewith.

By means of this machinery, the liquids or food products are preheated, as are the containers. A constant temperature is maintained before and during the canning. Then the liquids or food products are overheated in their containers for an adequate period of time, in accordance with the density, acidity, index of refraction, etc. After the containers have been sealed, they are superheated under pressure and gradually allowed to cool until room temperature, or a little above it, is reached.

In order to preserve milk, fermentable liquids and other food products, etc., it is preferred that a thermal chamber is used to give the proper pressure and temperature to the sealed containers during superheating.

As shown in the drawings, the apparatus, in general, comprises a container sterilization and preheating stage *a*, a contents preheating and filling stage *b*, an overheat stage *c*, a sealing stage *d*, a cooling stage *e*, and an accumulation stage *f*. In accordance with the preferred embodiment of the invention, the apparatus also includes a superheat stage *g* subsequent to sealing stage *d* but prior to cooling stage *e*.

Stage A.—Container sterilization and preheat

This stage consists of a tank 1 provided with suitable means for sterilizing and preheating the containers by the use of steam. A mechanical conveyor 2 of any suitable design extends the full length of tank 1, preferably adjacent one wall thereof, by means of which the containers are moved through the tank, being exposed to the elevated temperatures prevailing therein for a sufficient period to effect sterilization and to raise the temperature of the containers to approximately that of the material with which they are to be filled. Conveyor 2 extends for some distance past tank 1, as at 3, for transporting the containers from the tank to the filling stage.

Stage B.—Product preheat and filling

As the containers emerge from tank 1 on to section 3 of the conveyor, they pass under a filling or dispensing conduit 4 provided with suitable outlets by means of which the material to be preserved may be introduced into containers. Conduit 4 communicates with a pair of double-walled preheat tanks 5, a control valve 11 being interposed in the conduit adjacent each tank to meter the flow of the material. Each of the tanks 5 consisted of two concentric cylindrical walls between which steam may be admitted for the purpose of heating the interior of the inner chamber. The inner and outer walls are provided with valved discharge pipes 7 and 8, respectively, in order that they may be completely emptied for cleaning and like purposes. A pipe 6 connects the inner chambers of the tanks 5. Each tank has suitable indicating and regulatory devices 12, such as a thermometer and/or thermostat, to indicate and control the temperature of the inner chamber. Within the chamber is a mechanically driven rotating shaft 13 carrying stirring blades 14 by means of which a homogeneous constituency and uniform temperature may be achieved in the product.

Stage C.—Overheat

After filling, the containers are passed into an immersion tank 15 filled to a predetermined level with water heated in any desired manner, as with steam. Situated within tank 15 so as to support the containers in the heated water but with tops of the containers above the water level are a number of discs 16, each of which is rotated by means of a shaft 17 and driven gear 18. The discs are arranged in the tank according to a pattern and are provided with means for moving the containers from one disc to another, so that the containers are retained in tank 15 for a substantial period of time, passing from disc to disc, being rotated all the while to agitate the contents, until the discharge end of the tank is reached. The containers are conveyed from the tank by other rotating discs 19 to the sealing stage.

Stage D.—Sealing

The containers are automatically supplied with closures by means of a sealing machine 20 which may be of any desired type, depending, of course, upon the nature of the product, the type of the container, and type of closure being employed. Sealing is effected before the containers have had an opportunity to cool after leaving heating tank 15 in order to avoid the existence of any empty space between the level of the contents and the underside of the closure. After sealing is completed, the containers and contents may be cooled without undesirable effects and, to this end, they proceed to conveyor discs 21 for delivery to the cooling stage.

Stage E.—Cooling

Cooling tank 22 into which the containers are moved by discs 21 consists of a rectangular chamber filled with water which is maintained by any desired means at a temperature somewhat lower than that of the containers at this point but not so low as to subject the containers to sudden chilling. Within the chamber are a number of parallel endless chains arranged transversely of the general direction of movement of the containers. At the entrance to tank 22 and at each end of each chain is a star-wheel 23 which feeds the containers to the first chain, from each chain to the next succeeding chain, and finally to a rotating accumulation or storage table *f* from which they may be removed for packing. An arcuate guide member 24 is provided at the entrance to table *f* for the purpose of arranging the containers in a circle thereon. In order to control the speed of rotation of table *f*, a variable speed control mechanism (not shown) may be utilized.

Stage G.—Superheat

For those products which may be better preserved if superheated, a high temperature heating chamber is disposed prior to the cooling stage. This chamber consists of an oven-like structure 25 generally semi-circular in cross section which may advantageously be formed of reinforced metal insulated on the outside with a layer 26 of kiln brick, asbestos or other well known insulating material.

The rear wall of the chamber is preferably closed although a trap-door (not shown) may be included, if desired. The front wall has a door 27 constructed of iron, capable of being hermetically sealed and which is provided with a steam exhaust opening or vent 28 of variable size. Power exhaust means (not shown) may be effectively utilized in conjunction with vent 28.

Upon the floor of the chamber are a parallel pair of tracks 29 which support for rolling movement one or more small wheel carts 30 adapted to receive a plurality of containers. The chamber is heated with steam and for this purpose a series of steam pipes 31 extend the full length of the chamber around the upper inner periphery thereof, the pipes communicating at their ends and at spaced intermediate points with generally semi-circular distribution or header pipes 33. Pipes 31 are apertured at close intervals throughout their length to permit steam to flow into the chamber and directly contact the containers. The chamber is provided with suitable temperature indication and regulation accessories 34, such as thermometers, thermostats and valves.

EXAMPLE I

For milk with a specific gravity of 1.036, acidity of 1.4 to 1.7, index of refraction at 20° C. determined by the Lythgoe method, and 36 grams of fat content, preheating is carried out at a temperature of from 40–55° C. for a period of time from 10 to 15 minutes, this temperature being maintained during filling of the containers which have been previously warmed to about this level. Once the containers are filled, they are overheated to a temperature of from 55–87° C. during a period of time which varies between 5 and 15 minutes before sealing. After the containers have been sealed they are delivered to the thermal chamber where they are superheated to a temperature between 92 and 103° C. under pressure from 1 to 6 pounds, during a period which varies from 15 to 45 minutes. The containers are then cooled gradually down to 40° C., then to 20° C., and finally to 15° C. during a period of cooling of from 10 to 15 minutes.

I wish to make clear that the temperature and times may vary in accordance with the quality of the milk, or of milk in combination with other products; dependent upon such factors are density, acidity, index of refraction, fat content and the nature of any added material all of which must be determined prior to treatment.

EXAMPLE II

Beer, the index of refraction, density and alkalinity of which is known, is preheated to a temperature of from 55–75° C. during a period of time from 35 to 45 minutes. Then it is poured into preheated and sterilized cans or bottles and is kept at the same temperature for 15 to 25 minutes, which period of time varies in accordance with the characteristics shown by an analysis of the beer. Thereafter, it is passed to the capping machine, and then to the cooling chamber, or it is left to cool in an air current, or naturally by itself, until it reaches room temperature.

EXAMPLE III

For the treatment of wines or liquors of low alcoholic content, I first determine the index of refraction, specific gravity, acidity as regards malic and acetic acids, alkalinity and alcoholic content. These factors being known, the liquid is preheated to a temperature ranging between 40 and 55° C. during a period of time of from 15 to 25 minutes. When the containers are preheated to the proper temperature, they are filled with the preheated liquid and superheated to 55–75° C. for a period of time which may vary from 25 to 45 minutes. They are then capped or corked and gradually cooled down to a temperature which may vary from 15–25° C., the cooling requiring from 5 to 15 minutes.

I wish to make clear that this method is modified when the liquids (wines or liquors) are of high alcoholic content.

Frothy wines, either naturally or artificially fermented, or with added carbon dioxide gas, are bottled at room temperature prior to treatment and are then brought to the temperature indicated necessary by the characteristics shown by an analysis and which is essential to prevent secondary or subsequent fermentation and to fix them in a permanent state.

EXAMPLE IV

Tomato juice having a pH value of 4 and a specific gravity of 1.065, or a pH value of 5 and a specific gravity of 1.040 is brought to a temperature of 35–45° C. for 10 to 15 minutes, overheated to 65–75° C. and this latter temperature is maintained until the containers are sealed. Then they are superheated from 92–96° C. under a pressure of 1 to 3 pounds for 5 to 15 minutes. Finally, they are cooled gradually for 5 to 15 minutes to a temperature between 25° and 40° C.

EXAMPLE V

Tomato juice with whole or sliced tomatoes, having a specific gravity of 1.065 and a pH value of 5 is preheated to 50–60° C. during a period of time which varies between 15 and 35 minutes. After sealing, it is superheated to 60–75° C. for 20 to 30 minutes, under 1 to 4 pounds' pressure. Then it is cooled for 10 to 15 minutes to 20–25° C.

EXAMPLE VI

Carrot juice with a specific gravity of 1.060 and a pH value of 6.2 is preheated to 45–55° C. for 25 to 35 minutes. Then it is overheated up to 70–77° C. for 25 to 55 minutes and after being sealed in containers is superheated to 94–101° C. under 2 to 6 pounds' pressure for 15 to 25 minutes. Then the juice is cooled 15 to 25 minutes to 25–35° C.

EXAMPLE VII

Beet juice with a specific gravity of 1.040 and a pH value of 6.7 is preheated to 50–60° C for 10 to 25 minutes, then overheated to 75–80° C. for 30 to 40 minutes before sealing. After sealing, it is superheated to 94–100° C. under 1 to 5 pounds' pressure for 20 to 30 minutes. Then they pass to the cooling chamber to be cooled 5 to 10 minutes to 25–30° C.

EXAMPLE VIII

For turnip juice with a specific gravity of 1.030 and pH value of 6.2 the preheating temperature is 40–50° C. for a time of 15 to 25 minutes, overheating temperature is 65–75° C. for 20 to 30 minutes, superheating temperature is 94–100° C. at 2 to 5 pounds' pressure, for a time to 25 to 35 minutes, and cooling temperature is 20–30° C. reached after a time of 15 to 25 minutes.

EXAMPLE IX

For lemon juice with specific gravity of 1.020 and pH value of 3.5 preheat conditions are a temperature of 30–35° C. and time of 10 to 15 minutes; overheat conditions are a temperature of 55° and a time of 15 to 25 minutes; superheat conditions are a temperature of 92–96° C., a pressure of 1 to 3 pounds, and a time of 5 to 15 minutes; and cooling conditions are a time of 5 to 10 minutes and to achieve a temperature of about 20–25° C.

EXAMPLE X

Grapefruit juice with a specific gravity of 1.035 and pH value of 4.4 is preheated to 35–45° C. for 5 to 15 minutes, then overheated to 60–75° C. for 15 to 25 minutes. Superheating is carried out at 93–98° C. at 1 to 3 pounds' pressure for 5 to 15 minutes and cooling at 20–35° C. achieved gradually within 5 to 15 minutes.

EXAMPLE XI

Orange juice with a specific gravity of 1.030 and a pH value of 5.6 is preheated to 35–45° C. for 15 to 25 minutes, then overheated to 65–75° C. for 5 to 15 minutes and sealed. Thereafter they are moved on to the thermal chamber to be superheated to 92–94° C. under 1 to 2 pounds of pressure for 5 to 10 minutes. Finally, they are cooled gradually in the cooling chamber to 15–20° C. after about 5 to 15 minutes.

EXAMPLE XII

Cherry juice with a specific gravity of 1.040 and a pH value of 4.5 to 5 is perheated to 40–50° C. for 25 to 35 minutes, and overheated to 65–75° C. for 15 to 25 minutes. Then it is superheated to 92–98° C. under a pressure of 1 to 4 pounds, for 5 to 15 minutes and finally cooled to 20–25° C. after about 5 to 15 minutes.

EXAMPLE XIII

Sugar cane junce with a specific gravity of 1.030 and a pH value of 6.8 is preheated to 35–45° C. for 15 to 25 minutes, over heated to 65–75° C. for 25 to 35 minutes. Next it is superheated to 94–103° C. at 1 to 5 pounds' pressure for 15 to 25 minutes, and finally cooled 15 to 20 minutes to 20–25° C.

EXAMPLE XIV

Pineapple juice with pieces or slices of pineapple having a specific gravity of 1.025 and a pH value of 4.5, is preheated to 50–60° C. for 20 to 30 minutes, then overheated to 80–85° C. for 15 to 20 minutes. When the containers have been sealed they are superheated to 94–98° C., under 1 to 4 pounds' pressure, for 5 to 15 minutes. Then they are cooled 15 to 25 minutes to 20–25° C.

EXAMPLE XV

Pineapple juice without pieces or slices, having a specific gravity of 1.025 and a pH value of 4.5, is preheated to 40–55° C. for 15 to 25 minutes, then overheated to 65–75° C. for 20 to 35 minutes. Superheating takes place at temperatures to 92–96° C. under 1 to 4 pounds' pressure for 5 to 15 minutes, after which the juice is cooled 5 to 15 minutes to 25–35° C.

EXAMPLE XVI

Grape juice with a specific gravity of 1.040 and a pH value of 4.7 or 5.6 is preheated to 40–50° C. for 10 to 15 minutes, then overheated to 65–75° C. for 20 to 30 minutes. Next, it is superheated to 93–98° C. under 1 to 4 pounds' pressure for 15 to 25 minutes and finally cooled in the cooling chamber to 25–35° C. after about 10 to 15 minutes.

EXAMPLE XVII

Apple juice with a specific gravity of 1.040 and a pH value of 3.4 is preheated to 45–55° C. for 15 to 25 minutes, then overheated to 55–75° C. for 25 to 35 minutes. After the containers have been sealed, they are superheated to 93–98° C. under 1 to 4 pounds' pressure, for 5 to 10 minutes and cooled to 25–35° C. which requires 15 to 20 minutes.

EXAMPLE XVIII

Pear juice with a specific gravity of 1.030 and a pH value of 4.5 is preheated to 45–55° C. for 15 to 25 minutes, then overheated to 65–75° C. for 20 to 35 minutes. Next it is superheated to 94–98° C. under 1 to 2 pounds' pressure for 5 to 15 minutes, and finally cooled 15 to 25 minutes to 20–25° C.

EXAMPLE XIX

Prune juice with a specific gravity of 1.065 and a pH value of 4.4 is preheated to 35–55° C. for 15 to 25 minutes, then overheated to 55–77° C. for 20 to 30 minutes. When the containers have been sealed, they are superheated to 92–96° C. under 1 to 2 pounds' pressure for 5 to 15 minutes and cooled 5 to 15 minutes to 25–35° C.

EXAMPLE XX

Strawberry juice with a specific gravity of 1.050 and a pH value of 4.5 or 3.8 is preheated to 50–60° C. for 15 to 25 minutes, then overheated to 70–75° C. for 30 to 40 minutes. After the containers have been sealed, they are superheated to 94–98° C. under 2 to 3 pounds' pressure for 5 to 15 minutes, then cooled in the cooling chamber for 15 to 25 minutes, to 20–30° C.

EXAMPLE XXI

Cream of grade 28 to 25, with a pH value of 5.6, 5.8, or 6 and an acidity of 2 to 2.4 in 1/10 normal solution, is preheated to 45–65° C. for 45 to 55 minutes, then overheated to 75–87° C. for 45 to 55 minutes. Next it is superheated to 94–103° C. for 45 to 60 minutes, under 2 to 7 pounds' pressure, the particular temperature being chosen in accordance with the density and acidity of the cream. Finally, it is cooled 35 to 45 minutes until it reaches to 35–45° C.

I wish to make clear that the temperatures in the ranges specified may vary, always in keeping with the density or acidity of the milk, cream, fruit juice, fermentable liquid or food product to be processed, as acidity and density have a direct bearing upon proper temperature for each case.

I wish it to be understood that the foregoing descriptions and drawings are not intended to limit my rights of invention strictly to the letter of the same, since it is obviously possible to make changes and modifications in both method and apparatus without altering the essential features of my invention.

Having thus described the invention what I claim as new and desire to secure by Letters Patent is:

1. A thermo-physical method for canning and preserving edible materials which comprises the steps of continuously agitating the edible materials while heating them from a temperature of about 45° C. to a temperature of about 55° C. over a period of from 20 to 45 minutes substantially, removing oxygen from the said materials during this period, heating the canning receptacles to a temperature of about 45° to 55° C. and introducing the heated materials into said receptacles, further heating the receptacles and materials contained therein to a temperature of 65° to 87° C. for a period of 35 to 50 minutes to cause said edible material to expand and completely fill the receptacle, hermetically sealing the receptacles and thereafter steaming them at 92° to 103° C. at a pressure of 1 to 6½ pounds per square inch for a period of 35 to 50 minutes.

2. A method of preserving in receptacles fermentable solids, semi-solids, concentrates and liquid food substances which consists essentially of the steps of preheating said substances in the substantial absence of oxygen to a temperature of from 30–65° C. for a time of from 5 to 55 minutes, heating the receptacles to about the same temperature, introducing said substances into said receptacles in amounts slightly less than the capacity thereof, overheating said receptacles and contents to a temperature of from 55–87° C. for a time of 5 to 55 minutes, said contents expanding to completely fill the receptacles, hermetically sealing said receptacles, superheating the sealed receptacles to a temperature of from 92–103° C. under a pressure of from 1 to 6½ pounds per square inch for a time of from 5 to 60 minutes and finally cooling said receptacles for a time of from 5 to 45 minutes to a temperature of from 15–25° C.

3. A method of preserving in receptacles fermentable solid, semi-solid, concentrates, syrups and liquid food substances which consists essentially of the steps of preheating said substances in the substantial absence of oxygen to a temperature of from 45–55° C. for a time of from 25 to 45 minutes, heating the receptacles to about the same temperature, introducing said substances into said receptacles in amounts slightly less than the capacity thereof, overheating said receptacles and contents to a temperature of from 65–87° C. for a time of 35 to 50 minutes, said contents expanding to completely fill the receptacles, hermetically sealing said receptacles, superheating the sealed receptacles to a temperature of from 92–103° C. under a pressure of from 1 to 6½ pounds per square inch for a time of from 35 to 55 minutes and finally cooling said receptacles for a time of from 5 to 45 minutes to a temperature of from 5–15° C.

4. A thermo-physical method for canning and preserving milk which comprises the steps of continuously agitating the milk while heating it in the range of 40° to 50° C. for a period of 10 to 15 minutes, removing oxygen from said milk during this period, heating the canning receptacles to a temperature of about 40° to 55° C. and introducing the heated milk into said receptacles, further heating the receptacles and milk contained therein to a temperature of from 55° to 87° C. for a period of 5 to 15 minutes to cause the milk to expand and completely fill the receptacles, hermetically sealing the receptacles and thereafter steaming them in the range of 92° to 103° C. to a pressure of from 1 to 6½ pounds per square inch for a period of 15 to 25 minutes and gradually cooling the receptacles to 15° C.

5. A method for preserving fermentable liquids in receptacles which comprises the steps of preheating said liquids in the substantial absence of oxygen in the range of 35° to 60° C. for a period of 10 to 35 minutes, heating the receptacles to about the same temperature, introducing said liquids in said receptacles in amounts slightly less than the capacity thereof, overheating said receptacles and contents to a temperature of from 60° to 75° C. for a period of 20 to 30 minutes to expand said liquids to completely fill the receptacles, sealing said receptacles and superheating said receptacles under a pressure of from 1 to 6½ pounds per square inch in the range of 92° to 96° C. for a period of 5 to 30 minutes.

References Cited in the file of this patent

UNITED STATES PATENTS

| | | |
|---|---|---|
| 364,579 | Dahl | June 7, 1887 |
| 2,470,020 | Crowley | May 10, 1949 |
| 2,642,363 | Moeri | June 16, 1953 |